(12) United States Patent
Hunziker

(10) Patent No.: US 8,668,554 B2
(45) Date of Patent: Mar. 11, 2014

(54) BLASTING NOZZLE FOR A DEVICE FOR BLAST-MACHINING OR ABRASIVE BLASTING OBJECTS

(76) Inventor: Werner Hunziker, Jenins (CH)

( * ) Notice: Subject to any disclaimer, the term of this patent is extended or adjusted under 35 U.S.C. 154(b) by 391 days.

(21) Appl. No.: 13/034,558

(22) Filed: Feb. 24, 2011

(65) Prior Publication Data

US 2011/0306279 A1    Dec. 15, 2011

(30) Foreign Application Priority Data

Jun. 15, 2010 (DE) .......................... 10 2010 000 532
Oct. 22, 2010 (DE) .......................... 10 2010 060 134
Oct. 24, 2010 (DE) .......................... 10 2010 060 135

(51) Int. Cl.
    *B24B 1/00*      (2006.01)

(52) U.S. Cl.
    USPC ................. 451/102; 451/38; 451/89; 451/87; 451/99

(58) Field of Classification Search
    USPC ............................ 451/91, 87, 38, 99, 102, 89
    See application file for complete search history.

(56) References Cited

U.S. PATENT DOCUMENTS

| | | | | |
|---|---|---|---|---|
| 794,122 | A | * | 7/1905 | Rosengarten .................... 451/91 |
| 1,599,817 | A | * | 9/1926 | Hoevel .............................. 451/91 |
| 2,460,918 | A | * | 2/1949 | Bodine, Jr. ........................ 451/36 |
| 2,613,482 | A | * | 10/1952 | Hamacher ........................ 451/91 |
| 3,053,016 | A | * | 9/1962 | Johnston et al. ................. 451/91 |
| 3,343,304 | A | * | 9/1967 | Eppler ............................. 451/99 |
| 3,514,905 | A | * | 6/1970 | Loyal et al. ..................... 451/40 |
| 3,906,672 | A | * | 9/1975 | Kobayashi ....................... 451/75 |
| 4,505,077 | A | * | 3/1985 | Sheesley et al. ................... 451/2 |
| 5,127,198 | A | * | 7/1992 | Nakayama et al. ............. 451/82 |
| 5,201,150 | A | * | 4/1993 | Kuboyama et al. ............. 451/88 |
| 5,283,990 | A | * | 2/1994 | Shank, Jr. ........................ 451/90 |
| 5,390,450 | A | * | 2/1995 | Goenka ........................... 451/75 |
| 5,545,073 | A | * | 8/1996 | Kneisel et al. .................. 451/39 |
| 5,556,324 | A | * | 9/1996 | Shank, Jr. ........................ 451/89 |
| 5,660,580 | A | * | 8/1997 | Lehnig ............................ 451/38 |

(Continued)

FOREIGN PATENT DOCUMENTS

| | | |
|---|---|---|
| DE | 10 2005 016424 B3 | 7/2006 |
| EP | 1 820 604 B1 | 8/2007 |
| GB | 2191127 A * 12/1987 | ............... B24C 5/04 |
| WO | WO 00/59683 | 10/2000 |

OTHER PUBLICATIONS

EP Search Report of Appln. No. 11 40 1560.

*Primary Examiner* — George Nguyen
(74) *Attorney, Agent, or Firm* — Antonelli, Terry, Stout & Kraus, LLP.

(57) ABSTRACT

A device (33) for blast-machining or abrasive blasting objects such as structural elements, tools, household objects, pots, pans or the like, has a blast pot (3) for holding a blasting abrasive (35) which is connected via at least one line (21) to a blasting nozzle (24) which extends into a blasting space (1) in which the objects which are to be blasted can be placed. Compressed air is introduced above the blasting abrasive mixture (35) provided in the blast pot (3) by means of a pressure-generating means (43) and the blasting abrasive (35) thus being forced into the blasting space (1), the compressed air conveying via a second line (10) the granular material or the granular material mixture (35) and/or a suspension formed from granular material and liquid out of the blasting space (1) and back into the blast pot (3), which also takes the form of a pressurized space.

20 Claims, 6 Drawing Sheets

(56) References Cited

U.S. PATENT DOCUMENTS

| | | | |
|---|---|---|---|
| 5,704,825 A * | 1/1998 | LeCompte | 451/102 |
| 5,795,626 A * | 8/1998 | Gabel et al. | 427/458 |
| 5,800,246 A * | 9/1998 | Tomioka | 451/2 |
| 5,827,114 A * | 10/1998 | Yam et al. | 451/75 |
| 5,857,900 A * | 1/1999 | Shank, Jr. | 451/102 |
| 6,059,641 A * | 5/2000 | Okamoto | 451/99 |
| 6,283,833 B1 * | 9/2001 | Pao et al. | 451/40 |
| 6,364,748 B1 * | 4/2002 | Zwicker et al. | 451/38 |
| 6,390,898 B1 * | 5/2002 | Pieper | 451/75 |
| 6,719,610 B2 * | 4/2004 | Chou et al. | 451/28 |
| 6,837,775 B2 * | 1/2005 | Anand et al. | 451/38 |
| 8,257,147 B2 * | 9/2012 | Summers et al. | 451/38 |
| 2002/0142709 A1 * | 10/2002 | Massa et al. | 451/102 |
| 2009/0227185 A1 * | 9/2009 | Summers et al. | 451/39 |

* cited by examiner

Fig. 5c
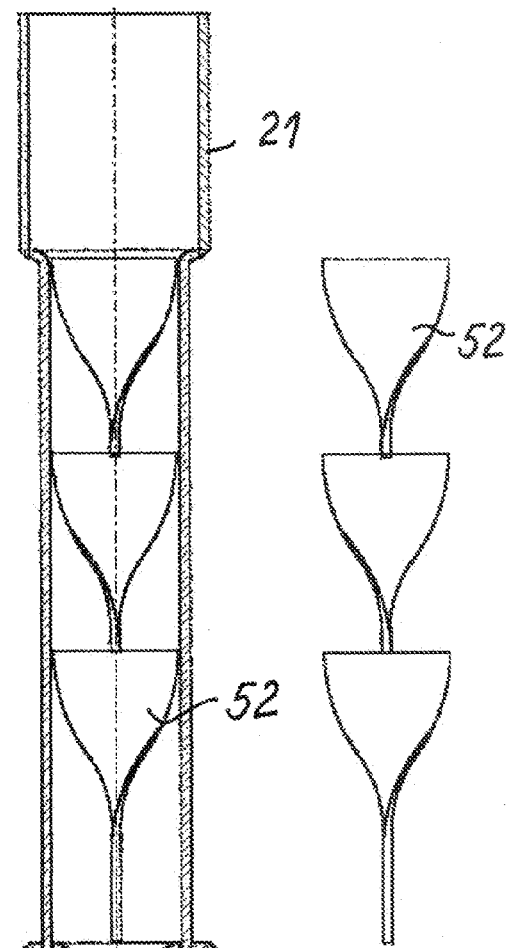
Fig. 5f
Fig. 5d
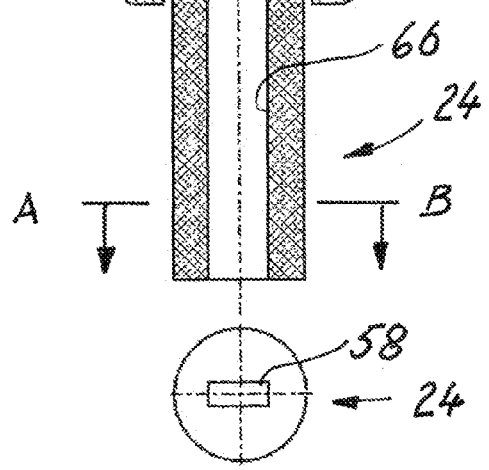

BLASTING NOZZLE FOR A DEVICE FOR BLAST-MACHINING OR ABRASIVE BLASTING OBJECTS

This application claims priority under the provisions of 35 U.S.C. §119 and 37 CFR §1.55, based on German Patent Application No. 10 2010 060 135.7, the contents of which are incorporated herein in their entireties.

The invention relates to a device with a blasting nozzle for blast-machining or abrasive blasting objects such as structural elements, tools, household objects, pots, pans or the like, having a blast pot for holding a blasting abrasive which is connected via at least one line to the blasting nozzle which extends into a blasting space in which the objects which are to be blasted can be placed.

DE 10 2005 016 424 B3 discloses a cabinet of a dry abrasive blasting system for conveying blasting abrasive. The enclosure has an enclosure part that forms a working space, a cover that at least partially closes the enclosure part at the top and a funnel-shaped base that at least partially closes the enclosure part at the bottom for catching and collecting the blasting abrasive that falls down. The blasting abrasive can be changed quickly and at the same time the enclosure can be equipped with a pressure vessel. For this purpose, the base has a round or oval shape in cross section, with a conical outer surface, with respect to a center axis of the enclosure. This apparatus is relevant only as a compact solution for the dry pressurized abrasive blasting system. In this apparatus, the blasting abrasive is situated in the pressure container and is mixed in the mixing chamber attached underneath with the blasting air that is at a constant pressure. The blasting abrasive is not forced out of the container by the compressed air. The constant pressure allows the blasting abrasive to trickle downward with the stream of air.

Very fine-grained, in particular mineral blasting abrasives such as corundum, silica, glass powder, quartz powder, glass beads etc. can be used for different reasons in dry abrasive blasting processes in only a very limited way. On the one hand, a significant problem with dust has to be overcome and, on the other hand, very fine grains tend to stick to the surface and thus prevent a satisfactory abrasive blasting action.

Processes are also known in which blasting abrasives and water are mixed. This mixture, also known as slurry, is prepared by means of a centrifugal pump, supplied to a blasting gun by means of a pump and then, by means of compressed air, the necessary blasting energy is imparted to the mixture to direct it onto the surfaces which are to be blasted. As the solid constituents of the mixture of water and blasting abrasive sink very quickly, the mixture must be constantly kept in motion. In many cases, for this purpose part of the suspension conveyed by the pump is diverted off and prepared in a special container that has a mixing apparatus.

Centrifugal pumps are prone to a high degree of wear. The blasting result (FIG. 3) with the injector blasting gun is not optimal as only a small central area is heavily blasted and the surrounding annular area is blasted significantly less heavily. In order to enlarge the central area, large nozzles are therefore used, but this results in a large amount of compressed air and thus a high energy consumption.

Trials with higher-output pumps which have a significantly higher pressure, in order to create a suspension or a water and blasting abrasive mixture and blast the objects with it, failed to improve the result.

The use of such a pump is highly disadvantageous as all of the elements that are exposed to wear have to be manufactured from polyurethane. The higher the pressure of this pump, the greater the wear and the lower the overall efficiency.

The poor blasting result is caused in particular by the fact that water and blasting abrasive, in particular the granular material, have different flow rates and these rise further when the delivery pressure of the pump is increased. The blasting result according to FIG. 3 can not be improved significantly as the water strikes the product to be blasted at a significantly higher speed than the granular material. This also causes the mixer to press the granular material outward on one side in the direction of the line wall and the water to be discharged from the nozzle at a higher speed and the granular material to strike only punctually a small area of the product to be blasted.

A device of this type is advantageous in particular for a uniform good distribution of the blasting abrasive mixture in the delivery line and in the region of the discharge end of the blasting nozzle. Moreover, the production of the known device with a special pump for delivering the blasting abrasive mixture or a suspension is elaborate and expensive and requires a high expenditure of energy.

The object of the invention is to produce a blasting nozzle for a device for blast-machining or abrasive blasting objects or workpieces in a simple and cost-effective manner, to ensure a uniform distribution of the blasting abrasive mixture in the liquid, in particular water, to improve the efficiency of the blasting process and thus also to reduce the expenditure of energy.

The object is achieved according to the invention by the device being assigned a mixing apparatus provided in the region of the line of the blasting nozzle or in or upstream of the inlet opening of the blasting nozzle. Thereby an optimum uniform spray pattern is produced on the surface of a tool and as a result the blasting effect is considerably improved. By spraying on the suspension, which consists of a liquid, especially water, and solids which are uniformly distributed therein, such as roughening, ablating or matting substances, in particular corundum, silicon oxide, glass powder or the like, a surface structure without defects is achieved by blasting a surface of a tool. It is also possible to use smooth or polishing substances, such as glass beads.

In the system according to the invention, the compressed air customary in most blasting systems is not used to accelerate the blasting abrasive grains, but the compressed air is used only for producing excess pressure in the suspension container, which excess pressure forces out the suspension to the blasting nozzles. The compressed air used is also used to return the mixture from the blasting chamber to the pressure container. The mixture is in a permanent cycle, and it is therefore necessary to ensure that a constant pressure cushion is present on the surface of the suspension. The blasting process is furthermore defined by good mixing of the two media liquid and blasting abrasive being continually ensured. Good mixing is a critical factor and separation of the blasting material is avoided owing to the arrangement and embodiment of the system according to the invention.

To this end it is advantageous that the mixing apparatus consists of one or more guide elements, which are used to mix and/or swirl the blasting abrasive.

This is facilitated by the fact that the guide elements can consist of individual screw-type elements which are either fixedly interconnected and welded together, or can be plugged together, with the guide elements or the static mixer being configured such that they can easily be interchanged.

For this purpose it is advantageous that the mixing apparatus or the guide elements are provided at a location in the line upstream of the nozzle inlet.

It is furthermore preferred that the mixing apparatus is provided in the line at a location upstream of the blasting nozzle, when viewed in the flow direction, and the blasting nozzle has a nozzle channel having an inlet opening and an outlet opening and the cross section of the nozzle channel of the blasting nozzle is approximately constant over a large section between inlet opening and outlet opening.

It is furthermore advantageous that the nozzle channel of the blasting nozzle in the inlet region has a cross section that is greater than a cross section which is the same size over the entire section of the nozzle channel and is approximately round, oval, polygonal, in particular rectangular.

It is also advantageous that the ratio of height to width of the cross section of the nozzle channel is between 1 and 4 or 1 and 3, in particular 1 and 2.5.

It is furthermore preferred that the height of the cross section of the nozzle channel is between 2 and 6 mm or between 3 and 5 mm, in particular approximately 4 mm, and the width of the cross section of the nozzle channel is between 7 and 13 mm or 9 and 11 mm, in particular approximately 10 mm.

According to a preferred embodiment of the solution according to the invention, provision is finally made for a distance between the outlet end of the blasting nozzle and the location of impingement of the blasting abrasive on a surface of the workpiece to be between 30 and 70 mm or 40 and 60 mm, in particular approximately 50 mm.

It is particularly important for the present invention that the inside surface of the nozzle channel has a polished or lapped surface and the nozzle core can be made of alloyed steel, in particular stainless steel.

In connection with the embodiment and arrangement according to the invention, it is also advantageous that the blasting nozzle consists of at least two nozzle parts which can be assembled and are held together using a screw connection.

It is also advantageous that compressed air is introduced above the blasting abrasive mixture provided in the blast pot by means of a pressure-generating means and the blasting abrasive is thus forced into the blasting space, the compressed air conveying the granular material or the granular material mixture and/or a suspension formed from granular material and liquid via a second line out of the blasting space and back into the blast pot, which takes the form of a pressurized space. As a result, the delivery pump which was previously necessary can be dispensed with as the suspension formed from a liquid, in particular water, and granular material is no longer moved via the known delivery pump, but only via compressed air through the delivery line, so that the previously prepared suspension in the blast pot is conducted through the delivery line in a uniformly distributed manner. The compressed air is not provided in the abrasive blasting system but by an external stationary compressor which can at the same time also be used for other processes, in other words does not only need to be designed for an abrasive blasting system.

The method having the following features is advantageous:
a) the blasting nozzle has a nozzle channel having an inlet opening and an outlet opening and the cross section of the nozzle channel of the blasting nozzle is approximately constant over a large section between inlet opening and outlet opening or the walls are mutually parallel;
b) over the entire section of the nozzle channel the cross section of the nozzle channel is approximately round, oval, polygonal, in particular rectangular;
c) the ratio of height to width of the cross section of the nozzle channel is 1 to 4 or 1 to 3, in particular 1 to 2.5;
d) the distance between the outlet end of the blasting nozzle and the location of impingement of the blasting abrasive on a surface of the workpiece is between 30 and 70 mm or 40 and 60 mm, in particular approximately 50 mm.

A uniform distribution of the blasting abrasive in the liquid is very important if good performance is to be achieved. It is therefore advantageous in the device according to the invention to provide a mixer which generates centrifugal forces that are as small as possible, in particular a static mixer or a mixer with a stirrer and drive device. The mixer provided in the blast pot loosens the granular material collected in the lower region of the container of the blast pot. A screw conveyor arranged vertically in the pressure container can, after the system has been idle for a relatively long period of time, also be readily started up again in the completely settled blasting abrasive. A thorough and lasting mixing is achieved with the aid of the return line to the pressure container as this return line opens out below the minimum level of the blasting mixture. As a result, in each recovery cycle the suspension flows into the reservoir present in the pressure container and effects a perfect swirling of the blasting mixture without the use of centrifugal force.

With a thoroughly mixed suspension, a uniform surface is obtained during the abrasive blasting procedure on that part of the area which is blasted. The spray pattern that is normal with injection blasting, with an intensively blasted core zone and a poorly blasted annular zone does not occur with the process according to the invention. The process also allows the use of nozzles which generate a fan-shaped spray and thus allow optimal adaptation to each blasting task.

As the compressed air serves only to force the suspension out of the blasting nozzles and to transport the blasting mixture back into the pressure container and thus is not involved in the blasting process, savings of up to 80% on energy costs can be made with the system according to the invention.

By means of the device according to the invention, it is also possible to dispense with the centrifugal mixer which was previously normally used and which also contributes to uniformly mixing the suspension. As the expenditure of energy for generating the required working pressure in the device is now supplied by an external compressor and a delivery stream of air is thus conducted into the line, with its help the uniformly distributed suspension also passes to the outlet end of the blasting nozzle, a significantly larger working area can be uniformly treated on the surface of the object to be blasted. A uniform blast-machining of the surface is ensured even when blasting nozzles are used with a wider spread of the nozzle spray.

By means of the device according to the invention, objects can be roughened, stripped, deburred, delustered or polished. For this purpose, a suspension of a liquid and a mineral blasting abrasive is used. Machining tools, measuring tools, precision engineering products and also household objects can thus be treated.

As a result, a very thorough mixing of the suspension is achieved, in other words finely distributed solids, such as granular material, are slurried in a liquid, and thus a significantly improved blasting performance is achieved, in other words the surface is treated considerably more uniformly and intensively than with the known blasting patterns as the suspension also has a high degree of kinetic energy because of the thorough mixing of liquid, in particular water, and granular material, which was not possible in dry abrasive blasting processes. When the system according to the invention and the process according to the invention are used, up to 80% of the energy costs can be achieved with a greater performance at the surface.

For this purpose, it is advantageous that the system consisting of the blasting space and at least the blast pot is designed as a closed pressurized system to which in operation a working pressure, in particular gas or compressed air, is applied which at least in the working process and at least in the blast pot acts on the suspension formed from a liquid and a blasting abrasive and/or on the granular material and/or on the granular material mixture and that the system, in particular the blast pot and/or the blasting space, is connected to the pressure-generating means or a compressor and/or a compressed-air supply line, wherein, to deliver the granular material mixture formed from a blasting abrasive, in particular granular material, and/or the suspension, the pressure medium line is provided with an inlet side which extends in the working process into the granular material mixture provided in the blast pot and/or the suspension on which the compressed air acts, the outlet end of the pressure medium line having one or more blasting nozzles which are placed in the blasting space.

It is moreover advantageous that the blasting space has in its lower region a collecting space, in particular one or more pressure sluices, in which the granular material mixture used for the blasting is caught and into which extends an inlet end of the return line which is connected to the blast pot, the outlet end being situated in the lower region of the blast pot or extending in the working process below the level of the blasting mixture held in the blast pot.

The blasting space has a first and a second sensor in the lower region, in particular in the region of the pressure sluices, the first or upper sensor signaling the maximum permitted filling height and the second or lower sensor signaling the minimum lower filling limit, while the blast pot also has a third sensor in the lower region and a fourth sensor in the upper region, the fourth or upper sensor signaling the maximum permitted filling height and the third or lower sensor signaling the minimum filling limit for the suspension or the granular material mixture.

So that large amounts of the liquid do not evaporate owing to the compressed air during the blasting, the system is operated in a completely closed circuit. As a result, additives can also be added to the suspension so that in addition to the mechanical action on the surface of the product or workpiece to be treated, a chemical action is also obtained on the surface with the aid of the blasting abrasive.

The suspension which is situated in a continuous main circuit can also be partially supplied to a closed secondary circuit which comprises the cyclone-style sludge separator. An adjustable amount of the water is constantly diverted off for cleaning by means of the secondary circuit. For this purpose, the sludge separator is connected to the blast pot with a vertical sifter. The liquid rises here by means of the excess pressure that exists in the container. The amount that flows off is adjusted by a choke valve in such a way that the lighter particles, in other words impurities, sink more slowly than the blasting abrasive used. These particles are separated out in an unpressurized reverse process in the cyclone-style separator. The cleaned liquid flows back again into the blasting space and thus into the circuit.

It is advantageous if the ratio between water and blasting abrasive is checked periodically and additives added if necessary. For this purpose, it is advantageous if the pressure container is equipped with a switchable valve so that small amounts of suspension can be drawn off.

Depending on the mixing ratio, additives are added and the chemical composition of the blasting mixture thus altered too.

Further advantages and details of the invention are explained in the patent claims and in the description and illustrated in the figures, in which:

FIGS. 5a to 5d show different embodiments of a nozzle, wherein FIG. 5d shows a section along the line A-B in FIG. 5b, and FIGS. 5e+5f show the guiding elements and the static mixer.

Figure 2:
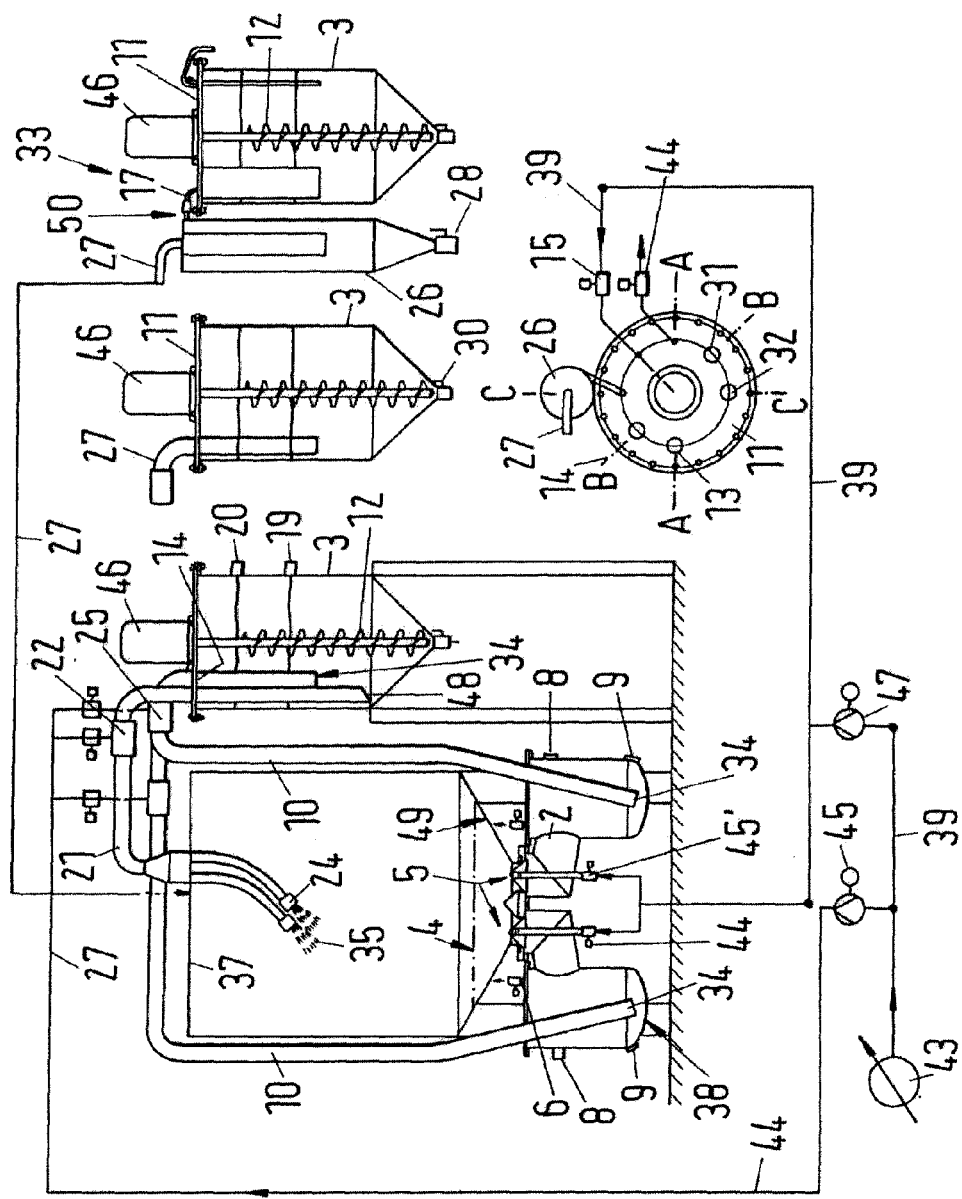
FIG. 2 shows a further exemplary embodiment of a device or a complete system for blast-machining or abrasive blasting objects, similar to that in FIG. 1 seen from the side and partially from above, but with two collecting spaces or pressure sluices that work in parallel.
Figure 3:
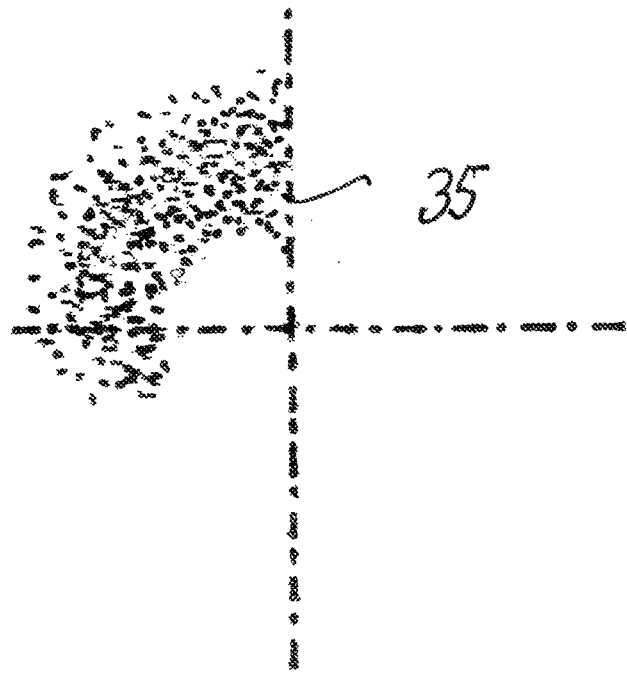
FIG. 3 shows a blasting pattern on the surface of a treated object according to the prior art.

A device 33 for blast-machining or abrasive blasting objects such as structural elements, tools, household objects, pots, pans is shown in FIG. 2 and is provided with a blast pot 3 which serves to hold blasting abrasive 35. The blast pot 3 is shown in FIG. 2 in a side view and in a top view so that the connections of the individual lines can be seen better.

The device 33 is associated with a mixing apparatus 52, as described in more detail below, which can be provided in the region of a line 21 of a blasting nozzle 24 or in or upstream of the inlet opening of the blasting nozzle 24.

A blasting space 1 can be designed as a rectangular (FIG. 1) or alternatively a cylindrical enclosure and be equipped with a cover 37 which is connected to a line connection 29 for a blower (not shown in the drawings) having a water vapor separator. Also, the blast pot 3 for holding blasting abrasive 35 is connected to the blasting space 1 via at least one line 21. The line 21 has, according to FIG. 5, one or more blasting nozzles 24 which extend into the blasting space 1 and by means of which blasting abrasive 35 can be applied to the product to be blasted.

The blasting space 1 can be designed in the lower region as a funnel and be equipped with a sieve 4 which prevents foreign bodies from entering the circuit.

At least one, in particular two, automatically switchable valves 5 are attached to the lower end of the funnel of the blasting space 1 and have a conical valve body that sits loosely on a pipe and is moved upward into a sluice 2 when compressed air flows in through a line 6. If the supply of compressed air is interrupted after the collecting space, in particular the pressure sluice 2, has been vented, the conical valve body falls back onto its valve seat again.

The pressure sluice 2 works in a cyclical operation and must hold the same amount of suspension 35 as is emitted from the blasting nozzle 24 in one working cycle. The sluice can have a different design. Depending on available space, it can be attached directly beneath the automatic valve 5 or can project laterally.

As mentioned above, the sluice has at least one switchable valve 5 for the inlet of compressed air and at least one switchable valve 7 for the venting.

The blasting nozzles 24 can be designed as round, oval or preferably flat nozzles. If multiple blasting nozzles 24 are provided, then greater efficiency can be achieved.

Figures 5A, 5E:
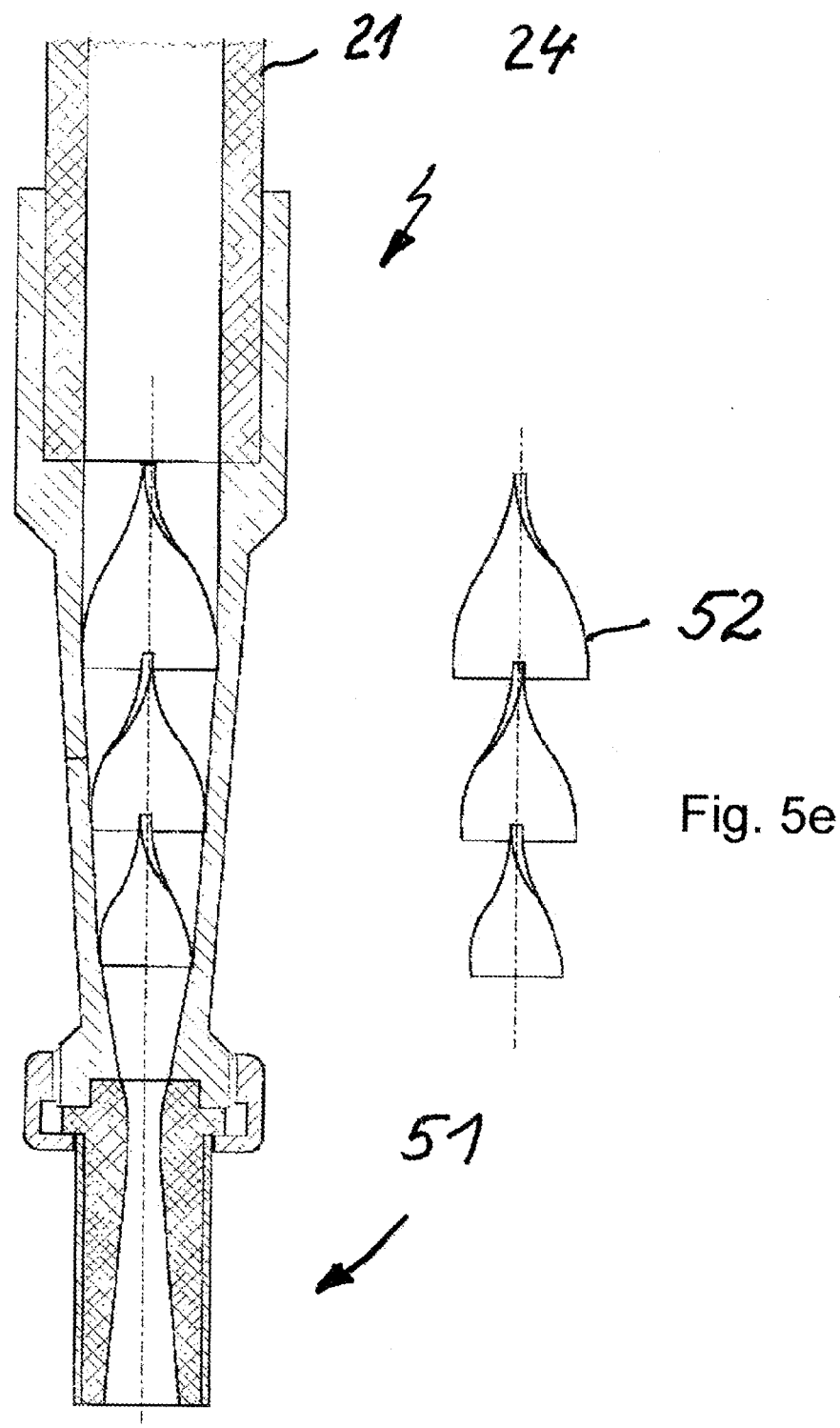
Figure 5B:
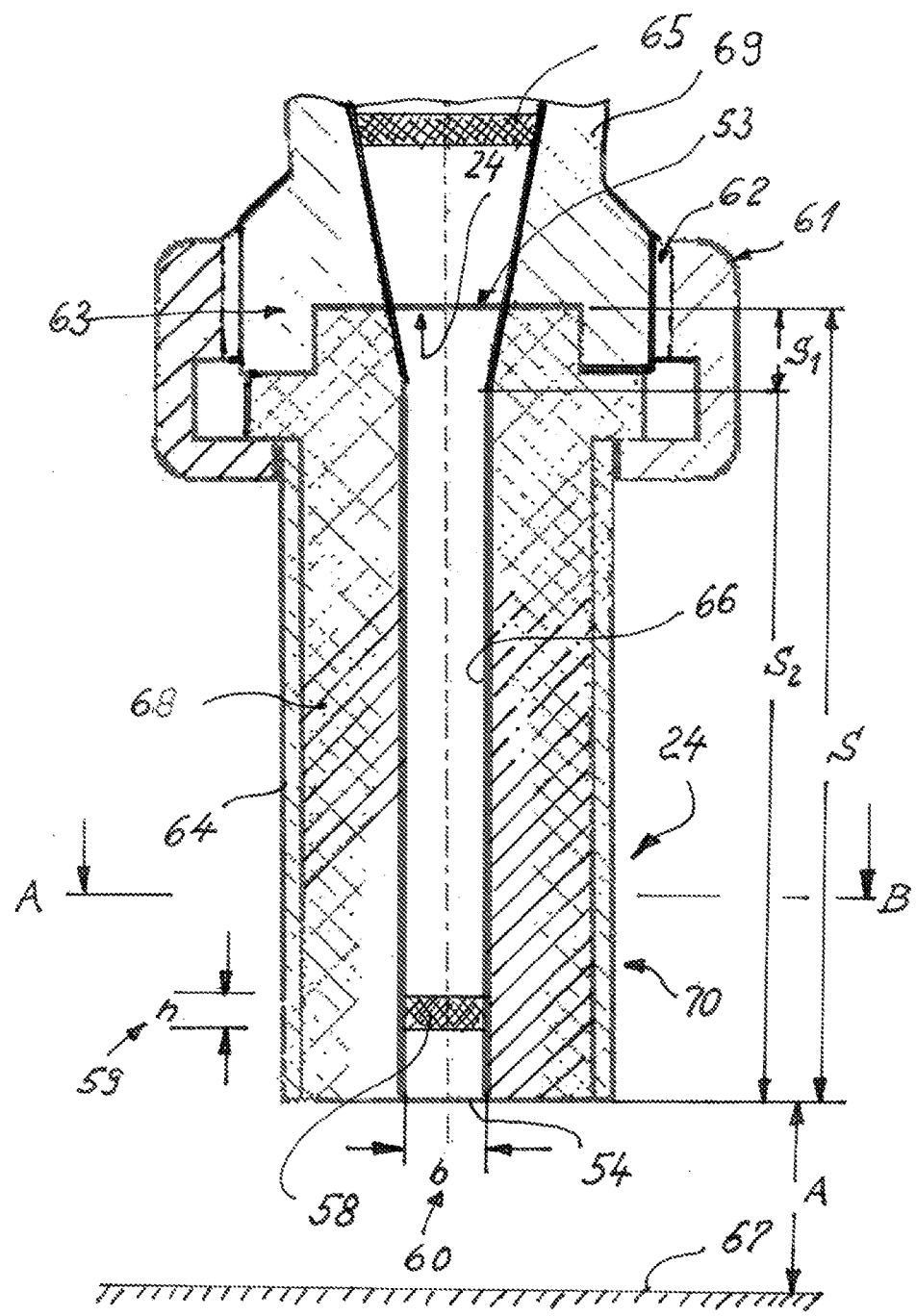

According to an exemplary embodiment in accordance with FIGS. 5a to 5c, the blasting nozzle 24 is connected to the line 21 which can have a round or alternatively other kind of cross section, in a similar way to the blasting nozzle 24. According to FIG. 5a, a continually tapering or conical line piece or nozzle part 69, or according to FIG. 5c a line with a cross section of uniform size, is connected to the line 21.

The blasting nozzle 24 can be configured, according to exemplary embodiment FIG. 5a, as a cylindrical round nozzle, as a round nozzle with a conical extension 51 or as a flat nozzle. The form of the blasting nozzle 24 is determined by the blasting purpose and can also have other shapes.

Figure 4:
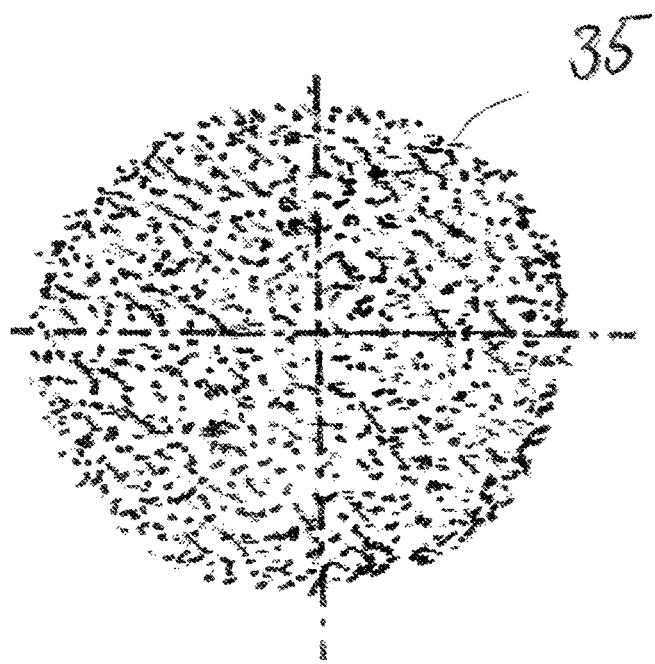
FIG. 4 shows a blasting pattern that is achieved with the device according to the invention.

According to FIGS. 5a to 5c, one or more guide elements or a static mixer 52, which contribute to the improvement of the spray pattern according to FIG. 4 and ensure even more intensive mixing of liquid and granular material, can be provided in the blasting nozzle 24. The guide elements or the static mixer 52 can consist of individual screw-type elements which are either fixedly interconnected and welded together, or can be plugged together. The blasting nozzle 24 and/or the guide elements or the static mixer 52 are configured such that they can easily be interchanged.

A steel, ceramic, carbide, boron carbide or polyamide material nozzle can be inserted into the nozzle holder and, according to FIGS. 5a to 5c, be secured or loosely connected to the line 21 using a fastening means, in particular a union nut 61.

The static mixer 52 can be integrated in the nozzle holder or in the line 21 (FIGS. 5a, 5c) such that the blasting material is alternately guided to the left and to the right. It is advantageous if one or more, preferably three, mixer elements are used which must be easily interchangeable since they are subject to heavy wear. The mixer 52 can be configured such that it can be pulled out of the line 21 after the blasting nozzle 24 is removed.

Two further alternatives are shown in FIGS. 5b and 5c, the embodiment according to FIG. 5c being the preferred embodiment. The two embodiments differ only slightly from each other. According to FIG. 5b, the line 21 or the line part is conical in design, as in FIG. 5a, while according to the embodiment in FIG. 5c the line 21 or the line part has a cross section of uniform size over its entire length.

The blasting nozzle 24 consists of a nozzle core 68 with a casing 64 and has a nozzle channel 66 that has an inlet opening 53 and an outlet opening 54. Over the entire distance $S_2$ between the inlet opening 53 and the outlet opening 54 of the nozzle channel 66, the cross section 58 can be constant and its inner walls can run parallel to each other. Moreover, the cross section 58 can be designed to be more or less round, oval or polygonal, in particular rectangular.

The nozzle channel 66 of the blasting nozzle 24 can have a cross section 65 in the inlet region which is greater than a cross section 58 which is the same size over the entire distance $S_2$ of the nozzle channel 66.

According to FIG. 5b, the ratio of the height 59 to the width 60 of the cross section 58 of the nozzle channel 66 can be 1 to 4 or 1 to 3, and in particular is 1 to 2.5.

The height 59 of the cross section 58 of the nozzle channel 66 is between 2 and 6 mm or between 3 and 5 mm, and in particular is approximately 4 mm, and the width 60 of the cross section 58 of the nozzle channel 66 is between 7 and 13 mm or between 9 and 11 mm, and in particular is approximately 10 mm.

The gap A between the outlet end 54 of the blasting nozzle 24 and the point of impact of the blasting abrasive 35 on a surface 67 of the workpiece is approximately between 30 and 70 mm or 40 to 60 mm, and in particular is approximately 50 mm.

The inner surface of the nozzle channel 66 can have a polished or lapped surface and the nozzle core 68 can be formed from a light steel, in particular stainless steel.

Figure 1:
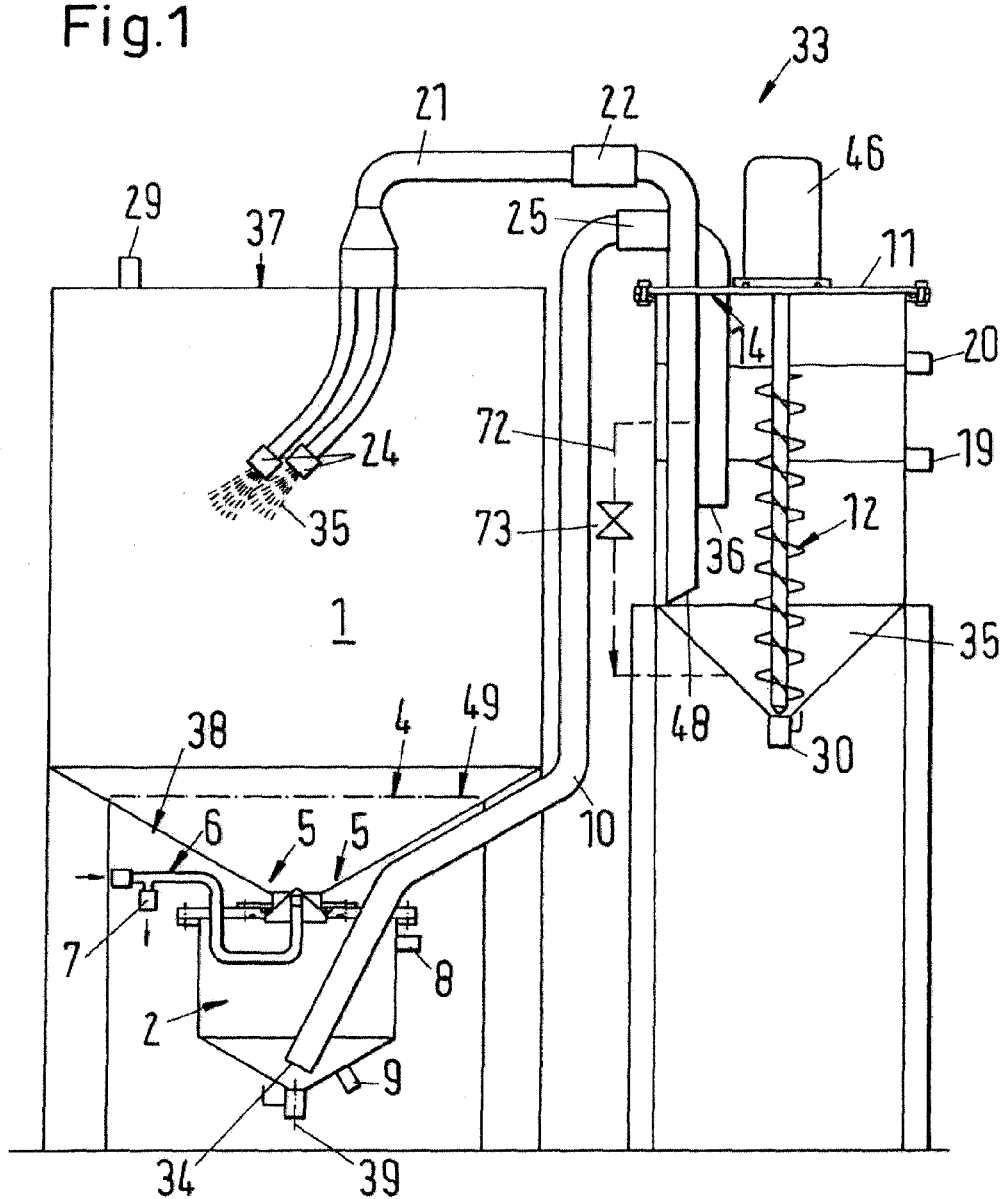
FIG. 1 shows a first exemplary embodiment of a device for blast-machining or abrasive blasting objects such as structural elements, tools, household objects, pots, pans or the like, having a blast pot for holding blasting abrasive.

According to FIG. 1, the stream of suspension is split into many streams by the mixer and swirled alternately to the left and to the right. For this purpose, it is advantageous if at least three mixing elements are introduced into the mixer. These can be combined or welded to one another to form an assembly and then be incorporated. As the mixing elements 52 are prone to a certain degree of wear, it is advantageous if they can be replaced easily.

The pressure vessel 3 for accommodating the mixer 12 can be conical in design in the lower region. As a result, the suspension accelerates as it moves continually downward during the mixing procedure.

According to a further alternative, a line 72 with at least one valve 74 can be connected to the lower part of the blast pot 3 so that air or, if necessary, water too can be supplied in this region when the system is operating or starting up so that the collected mixture is swirled there in the blast pot 3 and thus as a whole mixed even more thoroughly. While the process is running, the line is closed again via the valve 54 either by hand or by a control command of a computer that is not shown in the drawings. Excess air can, if necessary, be discharged from the system by means of a valve that is not shown in the drawings.

Depending on the embodiment, the mixer 12 can also be dispensed with and the suspension mixed as described only by means of air.

It is moreover advantageous if the system operates with an internal water circuit and a diaphragm pump is used that lies outside the vessel and is not shown in the drawings.

In this arrangement, the pump draws in the water, the inlet side 48 of the line 21 being provided in the pressure vessel only just below the minimum level.

When the system is started up, it operates with clear water and after it has been operating for a relatively long time it has the lowest concentration of blasting abrasive. The pressure line 21 can be guided to the lowest point inside the pressure vessel 3.

This system can operate independently of the pressure conditions, in other words it functions independently of whether the pressure vessel 3 is pressurized or not.

The system operates in a completely reliable manner with the aid of an appropriate control unit. Even after the system has not been operating for a few hours, it can be started at any time without the need for any special precautions. After it has been idle for a few days, it is advantageous if the pump runs for about an hour and the suction line lies in the clear water so that the pump and the pipe connectors are rinsed with clear water.

The use of a diaphragm pump affords optimum results. Even when the system has been idle for a week, a thorough mixing of the blasting abrasive is achieved again after just a few minutes. The system is consequently very uncomplicated and cost-effective and above all is subject to very little wear.

A steel, ceramic, tungsten carbide, boron carbide or polyamide nozzle can be introduced into the nozzle holder and secured to the line 21 by means of a fastening means, in particular a union nut 61.

The blasting abrasive 35 is forced into the blast pot 3 by means of a pressure-generating means 43. The pressure-generating means 43 can be a compressor which is connected to a cover 11 of the blast pot 3 via a pressure line 39 and a switching valve 15 and compressed air is supplied to the system and the blast pot 3 so that the blasting mixture 35 is supplied via the line 21 to the blasting space 1 and forced into the latter.

A second line 10 is also provided which supplies the granular material or the granular material mixture and/or a suspension formed from granular material and liquid from the lower region of the blasting space 1 or from a collecting space, in particular the pressure sluice 2, connected to the blasting space 1 into the blast pot 3 which is also designed as a pressurized space. The second line 10 has for this purpose a first inlet side 34 which ends shortly before a lower base 38 of the pressure sluice 2 and thus is immersed constantly in the granular material mixture ejected from the blasting nozzle 24 so that the compressed air can thus convey the granular material mixture back into the blast pot 3 when the system is operating.

The system that consists of the blasting space 1 and at least the blast pot 3 is designed as a closed pressurized system to which during operation a working pressure, in particular gas or compressed air, is applied which at least in the blast pot 3 constantly acts on the suspension formed from liquid and blasting abrasive and/or on the granular material and/or on the granular material mixture. It is also thereby ensured that the compressed air does not mix with the granular material mixture but serves only as a conveying means.

The sluice 2 of the blasting space 1 has in the lower region a first sensor 8 and a second sensor 9, the first or upper sensor 8 signaling the maximum permitted filling height and the second or lower sensor 9 signaling the minimum lower filling limit, while the blast pot 3 also has a third sensor 19 in the lower region and a fourth sensor 20 in the upper region, the fourth or upper sensor 20 signaling the maximum permitted filling height and the third or lower sensor 19 signaling the minimum filling limit for the suspension or the granular material mixture.

A mixing apparatus, in particular a stirrer 12 which has a drive device 46 and which extends into the lower region of the blast pot 3, is provided in the blast pot 3, the lower region of the blast pot 3 tapering downward and being designed in particular with a funnel shape. A switching valve, in particular a manual valve 30, via which the blast pot 3 can be emptied is situated in the funnel-shaped part 49 of the blast pot 3.

A sludge separator, in particular a cyclone separator 26, is associated with the blast pot 3 and is connected to the blast pot 3 via a line 17 or a secondary circuit, and to the blasting space 1 via a return line 27 so that cleaned liquid, in particular water, can be supplied back to the blasting space 1.

According to FIG. 2, the system can be equipped with two or more pressure sluices 2 in order to improve the reliability and efficiency of the system.

The system and the blasting space 1 operate as follows:

When only the pressure sluice 2 according to FIG. 1 is used, the connection between the pressure container 3 and the pressure sluice 2 must be interrupted by the pinch valve 25 and the valve 6 for the filling procedure. The valve, in particular the vent valve 44, must be opened for a short period of time, which entails a small loss of compressed air. When the pressure sluice 2 is used, the filling level in the pressure vessel 3 fluctuates depending on the volume of the blasting abrasive in the pressure sluice 2.

When a system is equipped with two pressure sluices 2, the level in the pressure sluice 2 changes only slightly. The amount of the suspension that flows out through the blasting nozzles 24 is continually transported back via the pressure sluices 2. Depending on the operating conditions, one pressure sluice 2 is always coupled to the pressure vessel 3, while the other pressure sluice 2 can be filled. The collecting space 1, in particular one or more pressure sluices 2, are connected to the cover 11 of the blast pot 3 via the line 39 and the switching valve, in particular an electromagnetic switching valve 15. The compressor 43 is connected to the line 39.

A further switching valve 16 can be connected if necessary to the pressure container in order to be able to create a build-up of pressure in the system which is normally effected via the line 39 connected to the collecting space, in particular the pressure sluice 2, said line 39 being equipped for this purpose with switching valves 45, 47. The switching of the valve 5 is the same in the examples according to FIGS. 1 and 2. The line 39 and the valve 45 as well as a line 44 are connected to the upper cover 37 of the blasting space 1 in order to increase the pressure during the working process.

Normally the filling level in the pressure container changes only slightly as the amount of suspension that has been introduced and the amount of suspension that is transported back to the blast pot 3 are more or less the same. Depending on the operating conditions, it is also possible to feed the blasting abrasive directly to the blasting nozzle 24 from the collecting space, in particular the pressure sluice 2. It is, however, advantageous to use the blasting mixture from the pressure container in order to ensure a constant mixing of the amount of suspension. When the system is switched off, the pressure sluice 2 must hold the entire amount of suspension.

As the solids in the suspension rapidly concentrate in large quantities at the bottom of the container and within a few hours can form a solid mass on the base of the container or the blast pot 3, all connections are provided at the top of the blast pot 3 in the cover 11. Sedimentation occurs in the container when the system has been switched off so that no blockages can occur in the valves and pipes.

It is advantageous if the pressure sluice is monitored especially in the lower region by means of a control apparatus such as sensors and it is thus ensured that when a disturbance occurs the control apparatus emits an optical and/or acoustic signal and initiates an automatic emptying of the collecting space, in particular the pressure sluice 2.

The pressure container and the blast pot 3 are sealed by means of a solid smooth cover 11. Various fittings and the mount for a mixer or a stirrer 12 having a drive 46 are provided on the cover 11.

The suspension 35 is returned via the line 10 and a connection 14 in the cover 11. When only one pressure sluice 2 is used, the valve 15 is permanently open as the level in the pressure vessel 3 fluctuates. When two pressure sluices 2 are used, the valve 15 remains permanently closed. The build-up of pressure is effected via the line 39 and the valve 15.

It is also possible to extract a sample during the working process by means of a valve 32 provided on the cover 11.

This concentrated arrangement of the connections and control apparatuses on the cover 11 entails that the pressure container has dimensions of different sizes depending on requirements.

In order to clean the liquid in the blast pot 3, an ascending pipe 18 that is connected to the cyclone separator 26 via the line 17 is fastened to the cover 11.

The line 21 has a pinch valve 22 via which the blasting nozzles 24 can be switched on. An identical pinch valve 25 which is provided in the line 10 is connected for the return of the suspension 34 via the line 10.

A relatively slowly rotating screw 42 of the mixer 12 provided in the pressure container can also start working when a solid mass has formed on the base of the blast pot 3. The separating effect of a screw stirrer is less than that of a quickly rotating whisk. However, the permanent mixing is assisted by the fact that the suspension that flows back in the pressure sluice assists the mixing process. The discharge opening 31 in the collecting space, in particular the pressure sluice 2, is therefore provided below the minimum level in the pressure container. The collecting space, in particular the pressure sluice 2, can be emptied via the valve 7 and the cyclone separator 26 via a valve 28 and the deposited sludge can be discharged. Samples can be taken in the working process from the blast pot 3 via a valve 32 provided on the blast pot 3.

REFERENCE NUMERALS 1 blasting space
2 collecting space, pressure sluice
3 blast pot, pressure vessel, pressure container
4 sieve
5 switchable valve
6 line, compressed air inlet
7 valve for emptying or venting the pressure sluice
8 first sensor, upper sensor
9 second sensor, lower sensor
10 return line
11 cover
12 stirrer having a drive device 46, mixer
13 compressed air supply line
14 connection for the return line of the suspension
15 switching valve
16 switching valve
17 line
18 ascending pipe
19 third sensor, lower sensor
20 fourth sensor, upper sensor
21 line, pressure medium line
22 valve, pinch valve
24 blasting nozzle
25 valve, pinch valve
26 cyclone separator
28 valve on cyclone separator
27 return line
29 line connection for a blower having a water vapor separator
30 valve, switching valve, manual valve
31 safety valve
32 valve
33 device for blast-machining or abrasive blasting
34 inlet side of the return line 10
35 blasting abrasive, granular material mixture, suspension
36 outlet end of the return line 10
37 cover
38 base of the collecting space, in particular the pressure sluice 2
39 line, pressure line
40 switching valve
42 stirrer screw
43 pressure-generating means
44 line, valve
45 valve
46 drive device
47 valve
48 inlet side of the pressure line 21
49 funnel-shaped part of the blast pot 3
50 valve, choke valve for the line 17
51 conical widened portion of the blasting nozzle 24
52 mixing apparatus, guide element, static mixer
53 inlet opening
54 outlet opening
58 cross section
59 H=height
60 B=width
61 screw connection, union nut
62 thread
63 sealing element
64 casing
65 cross section
66 nozzle channel with uniform cross section
67 workpiece surface
68 nozzle core
69 nozzle part
70 nozzle part
71 continual or conical tapering of the nozzle channel 66
72 line
73 valve
S total distance
$S_1$ distance
$S_2$ distance
A gap

I claim:

1. A device with a blasting nozzle for blast-machining or abrasive blasting objects such as structural elements, tools, household objects, pots, pans or the like, having a blast pot for holding a blasting abrasive which is connected via at least one line to the abrasive blasting nozzle which extends into a blasting space in which the objects which are to be blasted can be placed, wherein the device is assigned a mixing apparatus comprising at least one guide element configured to mix and/or swirl the blasting abrasive provided in the region of the line of the blasting nozzle or in or upstream of the inlet opening of the blasting nozzle.

2. The device as claimed in claim 1, wherein the mixing apparatus consists of one or more guide elements, which are used to mix and/or swirl the blasting abrasive.

3. The device as claimed in claim 2, wherein the guide elements can consist of individual screw-type elements which are either fixedly interconnected and welded together, or can be plugged together, with the guide elements or the static mixer being configured such that they can easily be interchanged.

4. The device as claimed in claim 2, wherein the mixing apparatus or the guide elements are provided at a location in the line upstream of the nozzle inlet.

5. The device as claimed in claim 1, wherein the mixing apparatus is provided in the line at a location upstream of the blasting nozzle, when viewed in the flow direction, and the blasting nozzle has a nozzle channel having an inlet opening and an outlet opening and the cross section of the nozzle channel of the blasting nozzle is approximately constant over a large section ($S_2$) between inlet opening and outlet opening.

6. The device as claimed in claim 1, wherein the blasting nozzle has a nozzle channel in the inlet region having a cross section that is greater than a cross section which is the same size over the entire section ($S_2$) of the nozzle channel.

7. The device as claimed in claim 1, wherein a cross section of a nozzle channel of the blasting nozzle over the entire section ($S_2$) of the nozzle channel is one of approximately round, oval, or polygonal.

8. The device as claimed in claim 1, wherein the ratio of height to width of a cross section of a nozzle channel of the blasting nozzle is between 1 and 4.

9. The device as claimed in claim 1, wherein the ratio of height to width of a cross section of a nozzle channel of the blasting nozzle is between 1 and 3.

10. The device as claimed in claim 1, wherein the ratio of height to width of a cross section of a nozzle channel of the blasting nozzle is between 1 and 2.5.

11. The device as claimed in claim 1, wherein the height of a cross section of a nozzle channel of the blasting nozzle is between 2 and 6 mm, and the width of the cross section of the nozzle channel is between 7 and 13 mm.

12. The device as claimed in claim 1, wherein the height of a cross section of a nozzle channel of the blasting nozzle is between 3 and 5 mm, and the width of the cross section of the nozzle channel is between 9 and 11 mm.

13. The device as claimed in claim 1, wherein the height of a cross section of a nozzle channel of the blasting nozzle is approximately 4 mm, and the width of the cross section of the nozzle channel is approximately 10 mm.

14. The device as claimed in claim 1, wherein a distance (A) between the outlet end of the blasting nozzle and the location of impingement of the blasting abrasive on a surface of the workpiece is between 30 and 70 mm.

15. The device as claimed in claim 1, wherein a distance (A) between the outlet end of the blasting nozzle and the location of impingement of the blasting abrasive on a surface of the workpiece is 40 and 60 mm.

16. The device as claimed in claim 1, wherein a distance (A) between the outlet end of the blasting nozzle and the location of impingement of the blasting abrasive on a surface of the workpiece is approximately 50 mm.

17. The device as claimed in claim 1, wherein the inside surface of a nozzle channel of the blasting nozzle has a polished or lapped surface and the nozzle core can be made of alloyed steel.

18. The device as claimed in claim 1, wherein the blasting nozzle consists of at least two nozzle parts which can be assembled and are held together using a screw connection.

19. The device as claimed in claim 1, wherein compressed air is introduced above the blasting abrasive mixture provided in the blast pot by means of a pressure-generating means and the blasting abrasive is thus forced into the blasting space, the compressed air conveying the granular material or the granular material mixture and/or a suspension formed from granular material and liquid via a second line out of the blasting space and back into the blast pot, which takes the form of a pressurized space.

20. A device for blast-machining or abrasive blasting objects such as structural elements, tools, household objects, pots, pans or the like, comprising:

a blasting space in which the objects to be irradiated can be placed during a working process;

a pressure chamber abrasive depot for receiving during the working process at least a minimum level of an abrasive comprising at least one of a granular material, a granular material mixture and a granular material in a suspension;

at least one abrasive blasting nozzle for blasting the abrasive on an article placed in the blasting space during the working process, the at least one abrasive blasting nozzle having a nozzle channel having an inlet opening and an outlet opening, wherein a cross-section of the nozzle channel is approximately constant over most of its length between the inlet opening and the outlet opening;

a pressure-generating device configured to provide compressed air into the pressure chamber abrasive depot above the abrasive in the pressure chamber abrasive depot;

a pressure medium line connecting the pressure chamber abrasive depot to the abrasive blasting nozzle for conveying the abrasive, the pressure medium line having inlet side in the abrasive in the pressure chamber abrasive depot during the working process and an outlet end comprising the at least one abrasive blasting nozzle;

a return line connecting the blasting space to the pressure chamber abrasive depot through which the abrasive is recycled by means of the compressed air generated and provided by the pressure-generating device into the pressure chamber abrasive depot; and a mixing device comprising at least one guide element configured to mix and/or swirl the abrasive in the pressure medium line at a point upstream of the at least one abrasive blasting nozzle in a flow direction of the abrasive.

\* \* \* \* \*